United States Patent
Han et al.

(10) Patent No.: US 12,027,700 B2
(45) Date of Patent: Jul. 2, 2024

(54) POSITIVE ELECTRODE COMPRISING GOETHITE FOR LITHIUM SECONDARY BATTERY AND LITHIUM SECONDARY BATTERY COMPRISING SAME

(71) Applicant: LG CHEM, LTD., Seoul (KR)

(72) Inventors: Suenghoon Han, Daejeon (KR); Dongjun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 879 days.

(21) Appl. No.: 17/044,639

(22) PCT Filed: Feb. 5, 2020

(86) PCT No.: PCT/KR2020/001638
§ 371 (c)(1),
(2) Date: Oct. 1, 2020

(87) PCT Pub. No.: WO2020/166870
PCT Pub. Date: Aug. 20, 2020

(65) Prior Publication Data
US 2021/0104741 A1    Apr. 8, 2021

(30) Foreign Application Priority Data

Feb. 13, 2019    (KR) .......................... 10-2019-0016498

(51) Int. Cl.
*H01M 4/52* (2010.01)
*H01M 4/02* (2006.01)
*H01M 10/0525* (2010.01)

(52) U.S. Cl.
CPC ....... *H01M 4/523* (2013.01); *H01M 10/0525* (2013.01); *H01M 2004/028* (2013.01)

(58) Field of Classification Search
CPC ............ H01M 4/523; H01M 10/0525; H01M 2004/028; H01M 4/5815; H01M 4/62
See application file for complete search history.

(56) References Cited

U.S. PATENT DOCUMENTS

| 2002/0070172 | A1 | 6/2002 | Schlegel |
| 2010/0285371 | A1* | 11/2010 | Lee et al. ............ H01M 50/446 |
| | | | 429/247 |

(Continued)

FOREIGN PATENT DOCUMENTS

| CA | 2 423 174 C | 10/2012 |
| CN | 1466548 A | 1/2004 |

(Continued)

OTHER PUBLICATIONS

Hur et al., KR20140097797A English Translation, Aug. 7, 2014.*

(Continued)

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

A positive electrode for a lithium secondary battery including a goethite having urchin shape as a positive electrode additive and a lithium secondary battery including the same. If the goethite having the urchin shape is applied to the positive electrode of the lithium secondary battery, there are effects that increase the charging/discharging efficiency of the battery and improve the lifetime characteristics, by adsorbing lithium polysulfide (LiPS) generated during the charging/discharging process of the battery.

8 Claims, 8 Drawing Sheets

● Sulfur-carbon composite

⋮ Preparation Example 1 (FeOOH having urchin shape)

∽ Preparation Example 2 (FeOOH having rod shape)

(56) References Cited

U.S. PATENT DOCUMENTS

| | | |
|---|---|---|
| 2011/0037032 A1 | 2/2011 | Hibst et al. |
| 2012/0237425 A1* | 9/2012 | Nishio et al. ....... H01M 10/052 423/306 |
| 2014/0361226 A1 | 12/2014 | Takada et al. |
| 2018/0138503 A1 | 5/2018 | Kim et al. |
| 2019/0181449 A1 | 6/2019 | Han et al. |
| 2020/0273634 A1 | 8/2020 | Lee et al. |

FOREIGN PATENT DOCUMENTS

| | | | |
|---|---|---|---|
| CN | 101485985 | A | 7/2009 |
| CN | 104577080 | A | 4/2015 |
| CN | 106328929 | A | 1/2017 |
| CN | 107394148 | A | 11/2017 |
| CN | 102612487 | A | 5/2024 |
| DE | 197 55 351 | A1 | 6/1999 |
| JP | 5-186226 | A | 7/1993 |
| JP | 9-255340 | A | 9/1997 |
| JP | 2000-90923 | A | 3/2000 |
| JP | 2002-270171 | A | 9/2002 |
| JP | 2008-176981 | A | 7/2008 |
| JP | 2009-4371 | A | 1/2009 |
| JP | 2011-132095 | A | 7/2011 |
| JP | 5113975 | B2 | 1/2013 |
| JP | 5144108 | B2 | 2/2013 |
| JP | 2014-71947 | A | 4/2014 |
| JP | 2017-103137 | A | 6/2017 |
| KR | 10-0270077 | B1 | 10/2000 |
| KR | 10-0482279 | B1 | 4/2005 |
| KR | 10-2009-0120058 | A | 11/2009 |
| KR | 10-2011-0025743 | A | 3/2011 |
| KR | 10-2013-0113562 | A | 10/2013 |
| KR | 10-2014-0097797 | A | 8/2014 |
| KR | 20140097797 | A * | 8/2014 ............ H01M 4/04 |
| KR | 10-2014-0116397 | A | 10/2014 |
| KR | 10-1541014 | B1 | 8/2015 |
| KR | 10-2017-0001374 | A | 1/2017 |
| KR | 10-2017-0032190 | A | 3/2017 |
| KR | 10-2018-0138133 | A | 12/2018 |
| WO | WO 2013151282 | A1 * | 10/2013 ............ C01B 32/05 |
| WO | WO 2017/109014 | A1 | 6/2017 |
| WO | WO 2017109014 | A1 * | 6/2017 ............ H01M 4/628 |
| WO | WO 2019/054803 | A1 | 3/2019 |

OTHER PUBLICATIONS

Hyeon et al., "WO2013151282A1 English Translation", Oct. 10, 2013.*

Agarwal et al., "Synthesis, Characterization and Application of Nano Lepidocrocite and Magnetite in the Degradation of Carbon Tetrachloride," S. Afr. J. Chem., vol. 64, 2011, pp. 218-224.

Bourlinos et al., "One-pot Borohydride Synthesis of Magnetically Modified Lepidocrocite," Chemistry Letters, vol. 34, No. 5, 2005, pp. 666-667.

International Search Report (PCT/ISA/210) issued in PCT/KR2020/001638, dated May 12, 2020.

Jia et al., "Facile one-pot synthesis of lepidocrocite (γ-FeOOH) nanoflakes for water treatment," New J. Chem., vol. 37, 2013, pp. 2551-2556.

Liu et al., "Hydrothermal synthesis and characterization of δ0-FeOOH and α-Fe2O3 uniform nanocrystallines," Journal of Alloys and Compounds, vol. 433, 2007, pp. 216-220.

Maiti et al., "Phase Evolution and Growth of Iron Oxide Nanoparticles: Effect of Hydrazine Addition During Sonication," Cryst. Growth Des., vol. 13, 2013, pp. 3637-3644.

Ponce-Castañeda et al., "Synthesis of Fe2O3 Species Embedded in a Silica Xerogel Matrix: A Comparative Study," Journal of Sol-Gel Science and Technology, vol. 25, 2002, pp. 29-36.

Extended European Search Report for European Application No. 20755823.0. dated Apr. 28, 2021.

* cited by examiner

[Figure 1]
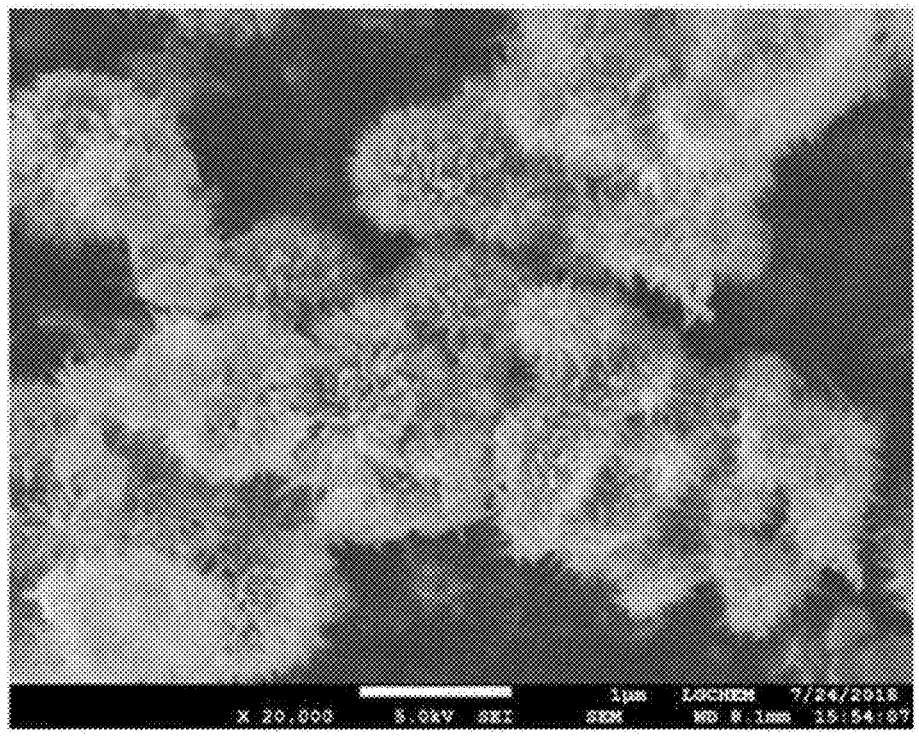
[Figure 2]
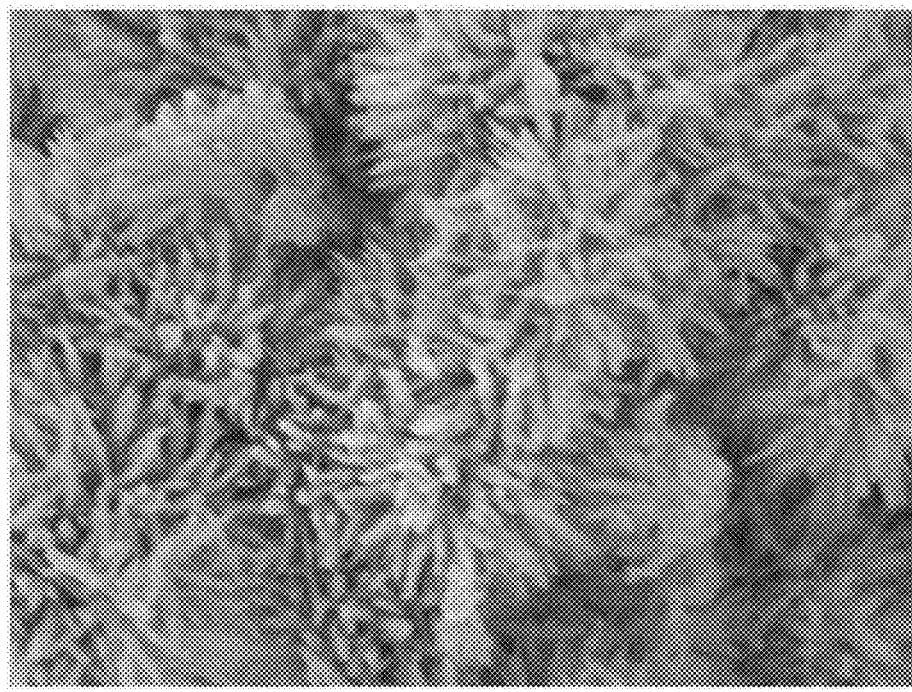

[Figure 3]
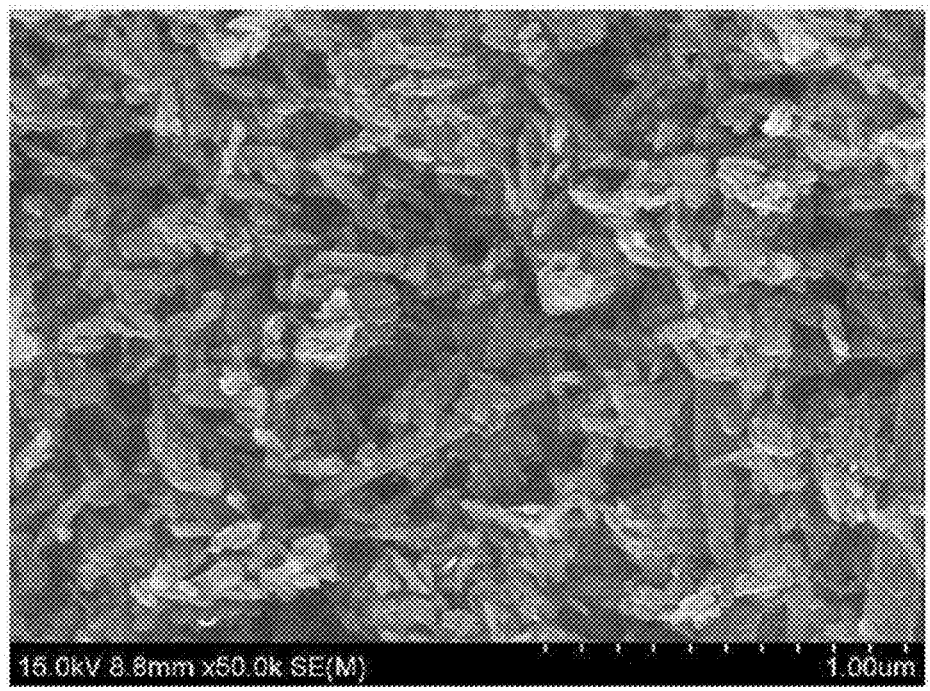
[Figure 4]
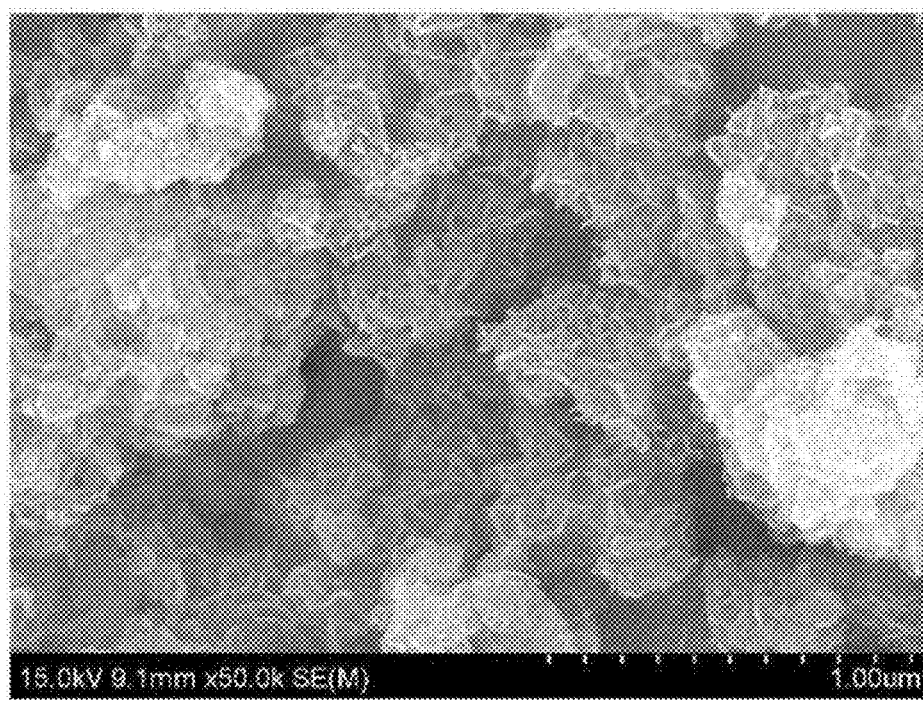

[Figure 5]
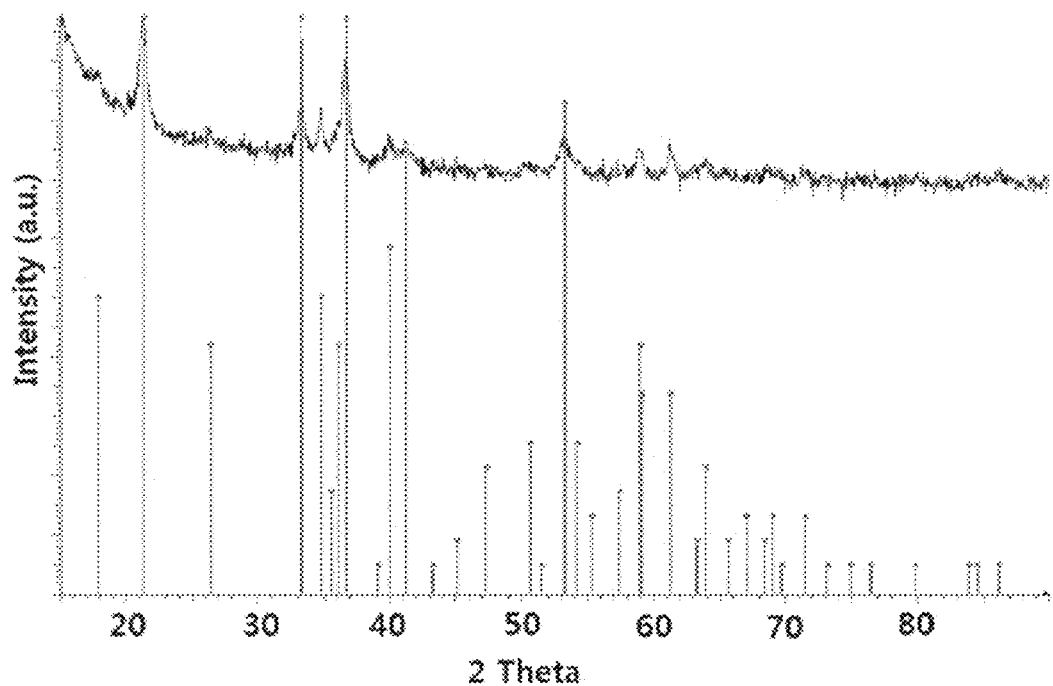

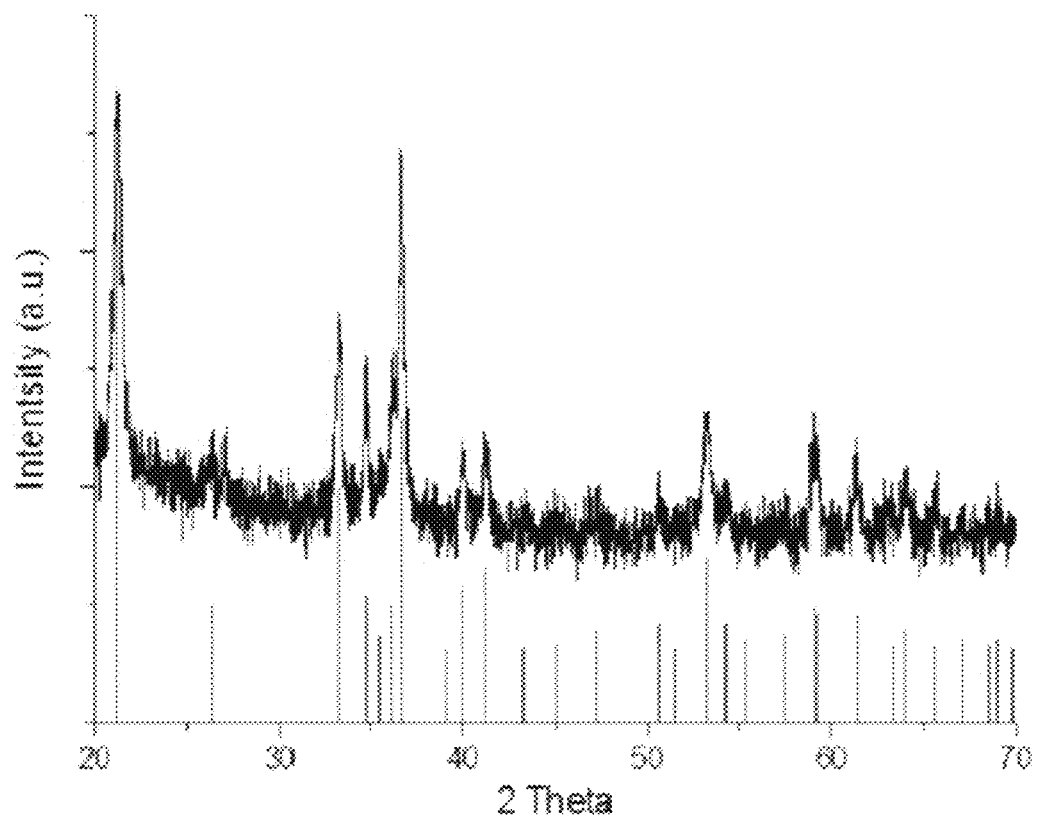
[Figure 6]

[Figure 7]
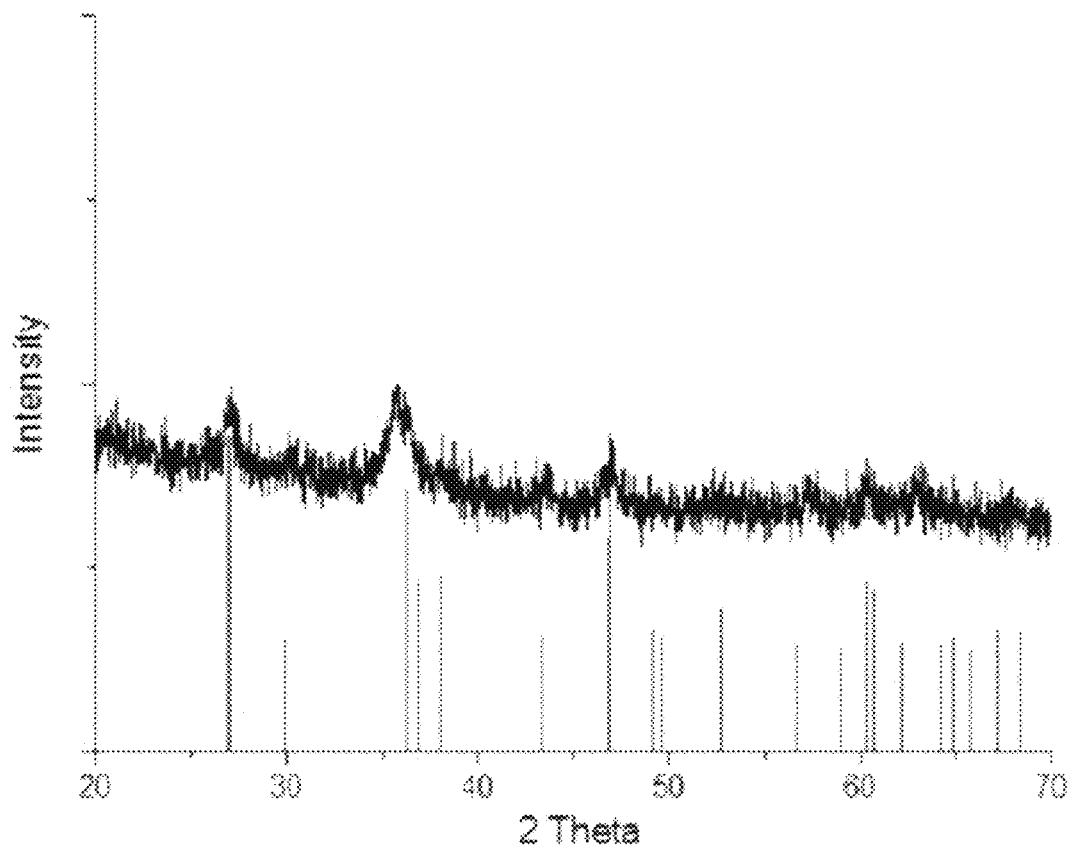

[Figure 8]
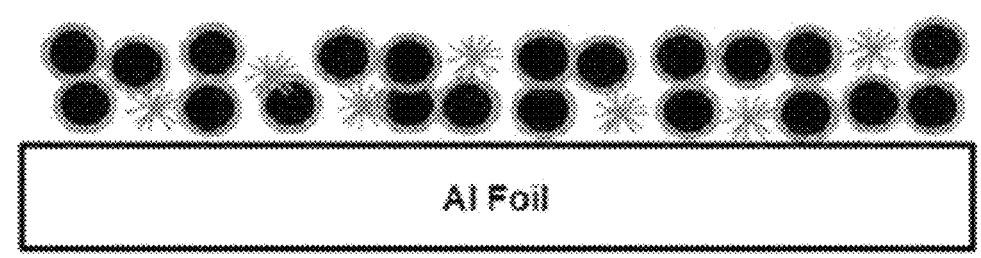
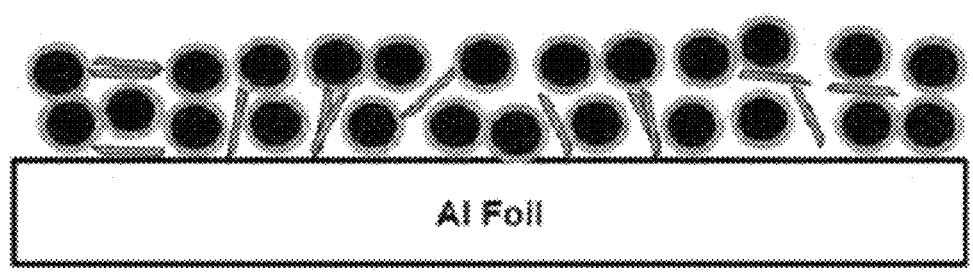
 Sulfur-carbon composite
 Preparation Example 1 (FeOOH having urchin shape)
 Preparation Example 2 (FeOOH having rod shape)

[Figure 9]
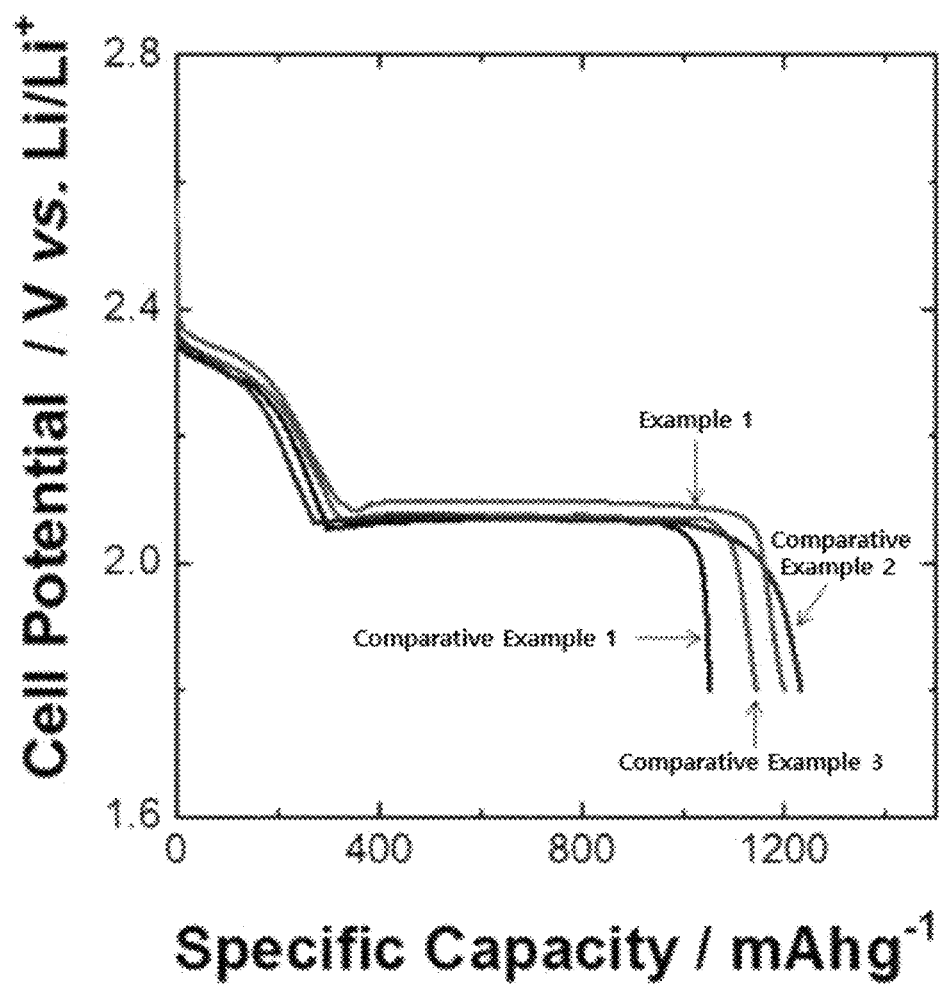

[Figure 10]
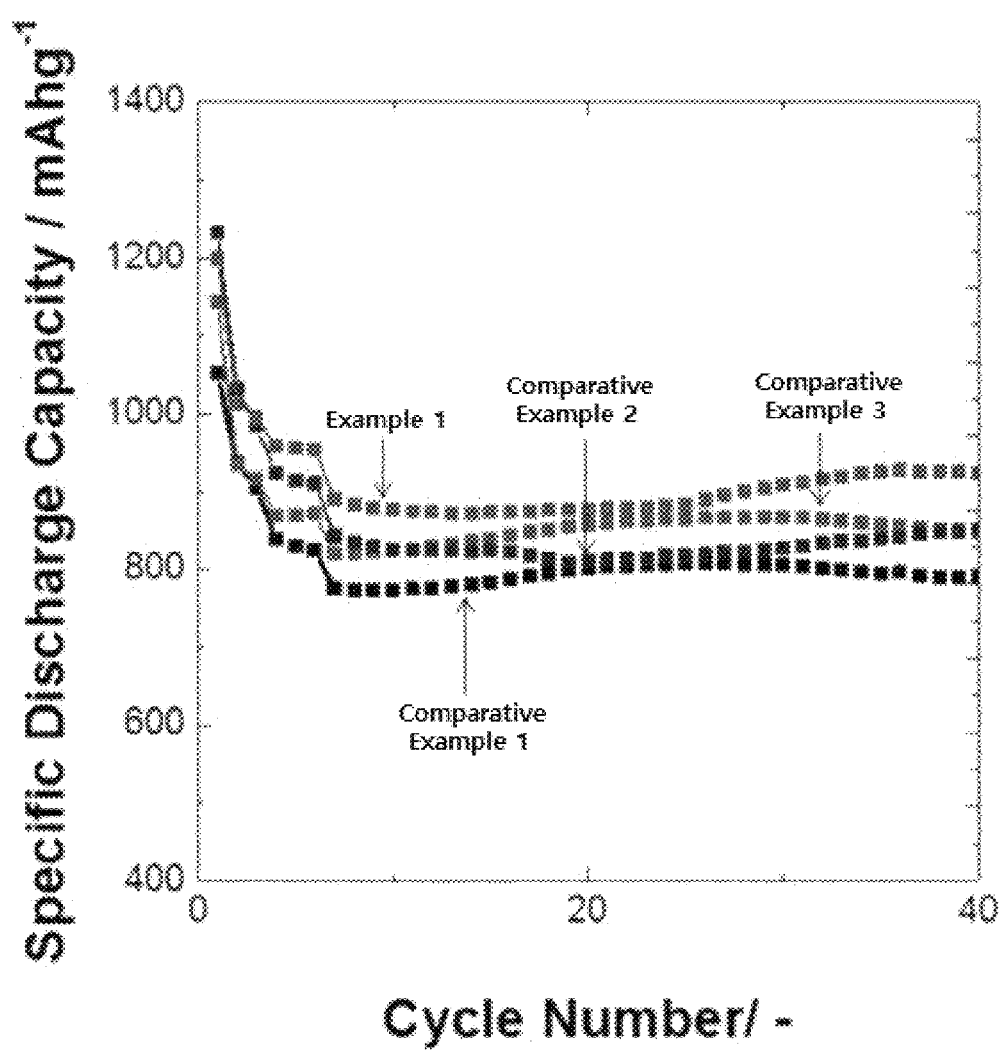

POSITIVE ELECTRODE COMPRISING GOETHITE FOR LITHIUM SECONDARY BATTERY AND LITHIUM SECONDARY BATTERY COMPRISING SAME

TECHNICAL FIELD

The present invention relates to a positive electrode for a lithium secondary battery containing goethite as a positive electrode additive, and to a lithium secondary battery with an improved initial discharging capacity and lifetime characteristics comprising the same.

The present application claims the benefit of priority based on Korean Patent Application No. 10-2019-0016498 filed on Feb. 13, 2019, the entire contents of which are incorporated herein by reference.

BACKGROUND ART

Secondary batteries have become important electronic components for portable electronic devices since the 1990s as an electric storage device capable of continuously charging and discharging unlike the primary battery which can only discharge once. In particular, since a lithium ion secondary battery was commercialized by Sony in Japan in 1992, it has led the information age as a key component of portable electronic devices such as smart phones, digital cameras, and notebook computers.

In recent years, lithium secondary batteries are rapidly growing in demand from electric sources of cleaner and power tool, medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and large-scale electric power storage systems (ESS), while further widening application area.

However, the lithium secondary battery, which has the best characteristics among the secondary batteries known to date, has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the capacity of the battery is determined by the positive and negative electrode materials, the lithium ion secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important. One of the biggest constraints on the sale of electric vehicles is that the distance that can be driven after a single charge is much shorter than that of vehicles equipped with general gasoline engines.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur battery is a new high capacity and low-cost battery system which goes beyond capacity limits determined by the intercalation/deintercalation reaction of lithium ions to the layered structure of the metal oxide and graphite which is the basic principle of existing lithium secondary battery, which can lead to replacement of transition metals and cost savings.

The lithium-sulfur battery has a theoretical capacity of 1,675 mAh/g derived from a conversion reaction of lithium ion and sulfur ($S_8+16Li^++16e^-\rightarrow 8Li_2S$) in the positive electrode, and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the theoretical energy density of 400 Wh/kg of commercially available lithium secondary battery ($LiCoO_2$/graphite) which uses layered metal oxides and graphite.

After the lithium-sulfur battery was found to be able to dramatically improve battery performance through the formation of nanocomposites around 2010, the lithium-sulfur battery is attracting attention as a new high capacity, eco-friendly, low-cost lithium secondary battery and is currently being studied intensively around the world as a next-generation battery system.

One of the main problems of the lithium-sulfur battery revealed to date is that since sulfur has an electrical conductivity of about $5.0\times 10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with a conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8\rightarrow Li_2S_8\rightarrow (Li_2S_6)\rightarrow Li_2S_4\rightarrow Li_2S_2\rightarrow Li_2S$ or the like, and among them, $Li_2S_8$, $Li_2S_4$ (lithium polysulfide) and the like, which are long chains of sulfur, are easily dissolved in a general electrolyte used in a lithium ion battery. When these reactions occur, not only the reversible positive electrode capacity is greatly reduced but also the dissolved lithium polysulfide diffuses into the negative electrode and causes various side reactions.

The lithium polysulfide causes a shuttle reaction especially during the charging process, and as a result, the charging capacity is continuously increased, and the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like.

The method of improving the electrolyte is a method to suppress the shuttle reaction as much as possible by using new electrolytes, such as functional liquid electrolytes, polymer electrolytes, and ionic liquids, which have a novel composition, and thus inhibiting the dissolution of the polysulfide into the electrolyte or controlling the dispersion rate to the negative electrode through adjustment of the viscosity and the like.

Studies on controlling the shuttle reaction by improving the characteristics of SEI formed on the surface of the negative electrode have been actively carried out. Typically, there is a method of adding an electrolyte additive such as $LiNO_3$ to form an oxide film of $Li_xNO_y$ or $Li_xSO_y$ on the surface of a lithium negative electrode, and a method of forming a thick functional SEI layer on the surface of lithium metal, or the like.

Finally, as a method of improving the properties of the positive electrode, there is a method of forming a coating layer on the surface of the positive electrode particles to prevent the dissolution of the polysulfide, or adding a porous material capable of capturing the dissolved polysulfide or so on. Typically, a method of coating the surface of a positive electrode structure containing a sulfur particle with a conductive polymer, a method of coating the surface of a positive electrode structure with a metal oxide on which lithium ions are transferred, a method of adding a porous metal oxide having a large specific surface area and a large pore size to a positive electrode, which is capable of absorbing a large amount of lithium polysulfide, a method of attaching a functional group capable of adsorbing lithium polysulfide onto the surface of a carbon structure, a method of wrapping sulfur particles using graphene or graphene oxide, or the like was proposed.

Although such efforts are under way, these methods are not only somewhat complicated, but also have a problem that the amount of sulfur that can be added, which is an active material, is limited. Therefore, it is necessary to develop new technologies to solve these problems in combination and to improve the performance of lithium-sulfur battery.

PRIOR ART DOCUMENT

Patent Document (Patent Document 1) Korean Patent No. 10-0482278 (Mar. 31, 2005), "METAL OXIDE NANO POWDER AND METHOD FOR MANUFACTURING THE SAME"

(Patent Document 2) Korea Laid-open Patent Publication No. 10-2017-0001374 (Jan. 4, 2017), "LITHIUM SULFUR BATTERY AND METHOD FOR MANUFACTURING THE SAME"

DISCLOSURE

Technical Problem

Therefore, in order to solve the problem of leaching of the lithium polysulfide occurring on the positive electrode side of the lithium secondary battery and to inhibit the side reaction with the electrolyte solution, the inventors of the present invention have introduced goethite having urchin-shape into the positive electrode of the lithium secondary battery, and as a result, it has been confirmed that the battery performance of the lithium secondary battery can be improved by solving the above problem, thereby completing the present invention.

Therefore, it is an object of the present invention to provide a positive electrode for a lithium secondary battery that can solve the problem caused by lithium polysulfide.

In addition, it is another object of the present invention to provide a lithium secondary battery having improved initial discharging capacity and lifetime characteristics of the battery by comprising the positive electrode described above.

Technical Solution

In order to achieve the above objects, the present invention provides a positive electrode for a lithium secondary battery comprising an active material, an electrically conductive material, a binder, and goethite which is in a form of a secondary particle comprising aggregated primary particles having rod shape.

In one embodiment of the present invention, a content of the goethite is 1 parts by weight to 15 parts by weight relative to 100 parts by weight of base solids contained in the positive electrode for the lithium secondary battery.

In one embodiment of the present invention, the primary particles having rod shape have a diameter of 10 nm to 50 nm.

In one embodiment of the invention, the primary particles having rod shape have a length of 50 nm to 500 nm.

In one embodiment of the invention, the secondary particle has a radial needle-like protrusion structure.

In one embodiment of the present invention, the average particle diameter of the goethite is 500 nm to 5 μm.

In one embodiment of the invention, the active material comprises a sulfur-carbon composite.

In one embodiment of the present invention, the sulfur-carbon composite has a sulfur content of 60 parts by weight to 80 parts by weight based on 100 parts by weight of the sulfur-carbon composite.

In one embodiment of the present invention, the positive electrode further_comprises a current collector and an electrode active material layer formed on at least one surface of the current collector, the electrode active material layer comprising the electrode active material, the electrically conductive material the binder, and the goethite, wherein a porosity of the electrode active material layer is 60% to 75%.

In addition, the present invention provides a lithium secondary battery comprising the positive electrode described above, a negative electrode, a separator interposed therebetween, and an electrolyte.

In one embodiment of the present invention, the secondary battery is a lithium-sulfur battery.

Advantageous Effects

If the goethite having urchin shape according to the present invention is applied to the positive electrode of the lithium secondary battery, the reactivity of the positive electrode for the lithium secondary battery is increased by adsorbing lithium polysulfide generated during charging/discharging of the lithium secondary battery and the side reactions with the electrolyte are suppressed.

In addition, the lithium secondary battery having the positive electrode containing goethite described above does not cause a reduction in the capacity of sulfur, which makes it possible to implement the battery with high capacity, and not only is capable of stably applying sulfur with high loading, but also has no problems such as short-circuiting or heat generation in the battery, thereby improving the stability of the battery. In addition, as the goethite comprised in the positive electrode has urchin shape, sufficient pores are formed in the electrode, which facilitates the impregnation of the electrolyte solution, and thus has the advantage of improving the charging/discharging efficiency of the battery and improving lifetime characteristics.

DESCRIPTION OF DRAWINGS

FIGS. 1 and 2 show scanning electron microscope (SEM) images of goethite according to Preparation Example 1 of the present invention.

FIG. 3 shows a scanning electron microscope (SEM) image of goethite according to Preparation Example 2 of the present invention.

FIG. 4 shows a scanning electron microscope (SEM) image of lepidocrocite according to Preparation Example 3 of the present invention.

FIG. 5 shows the results of X-ray diffraction (XRD) of goethite according to Preparation Example 1 of the present invention.

FIG. 6 shows the results of X-ray diffraction (XRD) of goethite according to Preparation Example 2 of the present invention.

FIG. 7 shows the results of X-ray diffraction (XRD) of lepidocrocite according to Preparation Example 3 of the present invention.

FIG. 8 is a schematic diagram of a positive electrode for a lithium secondary battery containing goethite according to Preparation Examples 1 and 2 of the present invention.

FIG. 9 shows the results of the measurement of the discharging capacity of the lithium secondary battery according to the examples and comparative examples of the present invention.

FIG. 10 shows the results of measurement of lifetime characteristics of the lithium secondary battery according to the examples and comparative examples of the present invention.

BEST MODE

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The present invention provides a positive electrode for a lithium secondary battery, which is improved in the problem of the continuous deterioration of the reactivity and the continuous reduction of the discharging capacity of the electrode due to the dissolution and shuttle phenomenon of lithium polysulfide by supplementing disadvantages of a conventional positive electrode for a lithium secondary battery.

Specifically, the positive electrode for the lithium secondary battery provided by the present invention comprises an active material, an electrically conductive material, and a binder, and further comprises goethite ($\alpha$-FeOOH) having urchin shape as a positive electrode additive.

In particular, the goethite having urchin shape is comprised in the positive electrode for the lithium secondary battery in the present invention, and thus can adsorbs lithium polysulfide, thereby reducing the reduction of the lifetime of the lithium secondary battery due to the delivery of lithium polysulfide to the negative electrode, and can inhibit the reduced reactivity caused by lithium polysulfide, thereby increasing the discharging capacity of the lithium secondary battery comprising the positive electrode and improving the lifetime of the battery.

Goethite having Urchin Shape and Preparation Method Thereof

Goethite which is a positive electrode additive according to the present invention may preferably be prepared by reacting $FeCl_3 \cdot 6H_2O$ with $Na_2S_2O_3$. The reaction has an advantage that it can be proceeded in mild conditions even without using powerful reducing agents such as $NaBH_4$ or hydrazine.

In one embodiment, the goethite having urchin shape may be prepared by reacting $FeCl_3 \cdot 6H_2O$ of 0.04 to 0.08 M with an aqueous $Na_2S_2O_3$ solution of 0.1 to 0.3 M. If the aqueous $Na_2S_2O_3$ solution and $FeCl_3 \cdot 6H_2O$ are mixed, the solution becomes black immediately after the reaction, and as the reaction is proceeded gradually, the color turns to yellowish orange after several tens of seconds.

For example, the reaction may be performed at 60 to 80° C. for 4 to 8 hours at a heating rate of 2.5° C./min. After the reaction is completed, the reaction product is separated by filtration under reduced pressure, and is washed sequentially with water and ethanol. Thereafter, sufficient air may be introduced, followed by drying at 80° C. for 6 to 12 hours to prepare a goethite having urchin shape.

Positive Electrode for Lithium Secondary Battery

The present invention provides a positive electrode for a lithium secondary battery comprising an active material, an electrically conductive material, and a binder, wherein the positive electrode comprises goethite having urchin shape as described above.

In this case, the positive electrode for the lithium secondary battery may be one formed by placing the base solids comprising the active material, the electrically conductive material, and the binder on the positive electrode current collector.

As the current collector, it may be preferable to use aluminum, nickel, or the like having excellent electrical conductivity.

In one embodiment, the goethite having urchin shape may be contained in an amount of 1 to 15 parts by weight, preferably 1 to 10 parts by weight based on 100 parts by weight of the base solids containing the active material, the electrically conductive material, and the binder. If the content is less than the lower limit value of the above-mentioned numerical range, the adsorption effect for the polysulfide may be insignificant. If the content exceeds the upper limit value, the energy density per weight of the electrode can be reduced, and more pores than necessary are formed in the electrode, thereby reducing the energy density per volume. Therefore, the content is appropriately adjusted within the above range.

The goethite may be a goethite prepared by the preparation method presented in the present invention.

FIGS. 1 and 2 show scanning electron microscope (SEM) images of goethite ($\alpha$-FeOOH) prepared by the preparation method described above, and it can be confirmed that the goethite having urchin shape prepared according to the preparation method described above was prepared. The goethite having urchin shape may be crystalline secondary particles formed by aggregation of primary particles having rod shape having a diameter of 10 to 50 nm and a length of 50 to 500 nm, and an average particle diameter thereof may be 500 nm to 5 μm. The urchin shape may refer to a radial needle-like protrusion structure formed by aggregating around at least one point of the primary particle having rod shape and extending outwardly, as is a surface of a urchin, and the average particle diameter thereof can be measured by the length from one outermost point of an outwardly extending needle-like protrusion to another outermost point of another needle-like protrusion extending in the horizontally opposite direction.

Such goethite having urchin shape may form a slurry together with an active material, an electrically conductive material, and a binder, and then coated on a current collector. In this case, since the urchin shape can be maintained without breaking even under pressure during coating, the pore distribution in the active material layer, which is the coating layer, can be delocalized. Since the electrolyte solution can be re-diffused through the pores secured through goethite having urchin shape as a basing point, the pore efficiency for improving the performance of the battery can be improved even though the overall porosity of the active material layer is the same.

FIG. 8 shows a schematic diagram of a positive electrode of a lithium secondary battery comprising goethite having rod shape, which is a primary particle, and goethite having urchin shape, which is a secondary particle formed by aggregation of the primary particles. Referring to FIG. 8, if goethites having rod shape are comprised in the positive electrode, as they are bundled or packed together with the electrode material, the surface area exposed to the electrolyte solution is decreased, whereas there is an advantage that the goethite having urchin shape has excellent impregnation characteristics for electrolyte solution due to pores originating from the secondary structure and promotes the conversion of lithium polysulfide during charging/discharging of the battery.

FIG. 5 shows the results of X-ray diffraction (XRD) data of goethite having urchin shape prepared by the above preparation method. As a result of the X-ray diffraction of FIG. 5, it can be seen through the detection of effective peaks at $2\theta=21.223°$, $33.241°$, $34.700°$, $36.055°$, $36.649°$, $39.984°$, $41.186°$, $53.237°$, and $59.023°$ that crystalline goethite was synthesized.

Meanwhile, the active material in the base solids constituting the positive electrode of the present invention may comprise elemental sulfur ($S_8$), a sulfur-based compound, or a mixture thereof. Specifically, the sulfur-based compound may be $Li_2S_n$ (n≥1), an organic sulfur compound, or a carbon-sulfur composite $((C_2S_x)_n: x=2.5\sim50, n\geq2)$.

The positive electrode for a lithium secondary battery according to the present invention may preferably include an active material of a sulfur-carbon composite. Since the sulfur material alone is not electrically conductive, it can be used in combination with an electrically conductive material. The addition of goethite according to the present invention does not affect the structure maintenance of this sulfur-carbon composite.

The carbon in the carbon-sulfur composite according to the present invention has a porous structure or a high specific surface area, and thus any carbon material conventionally used in the art may be used. For example, the porous carbon material may be, but is not limited to, at least one selected from the group consisting of graphite; graphene; carbon black such as Denka black, acetylene black, Ketjen black, channel black, furnace black, lamp black, and thermal black; carbon nanotube (CNT) such as single-wall carbon nanotube (SWCNT) and multi-wall carbon nanotube (MWCNT); carbon fibers such as graphite nanofiber (GNF), carbon nanofiber (CNF), and activated carbon fiber (ACF); and activated carbon. Also, the porous carbon material may be spherical, rod-shaped, acicular, plate-shaped, tubular, or bulky, and may be used without limitation as long as it is commonly used in lithium secondary batteries.

The active material may be preferably used in an amount of 50 to 95 parts by weight, and more preferably about 85 parts by weight, based on 100 parts by weight of the base solids. If the active material is comprised in an amount less than the above range, the reaction of the electrode is difficult to be sufficiently exerted. Even if the active material is comprised in an amount more than the above range, the content of other electrically conductive materials and binders is relatively insufficient and it is difficult to exhibit sufficient electrode reaction. Therefore, it is preferable to determine an appropriate content within the above range.

In one embodiment, the carbon-sulfur composite may contain 60 to 80 parts by weight of sulfur, and preferably 70 to 75 parts by weight of sulfur, based on 100 parts by weight of the carbon-sulfur composite. If the content of sulfur is less than 60 parts by weight, the content of the carbon material in the carbon-sulfur composite is relatively increased. As the content of the carbon is increased, the specific surface area is increased and thus when preparing the slurry, the amount of binder added should be increased. Such an increase in the additive amount of the binder may eventually increase the sheet resistance of the electrode, and may act as an insulator to prevent electron pass, thereby deteriorating the battery performance. If the content of sulfur exceeds 80 parts by weight, the sulfur or sulfur compounds not bound to the carbon material may be aggregated with each other or re-leached on the surface of the carbon material, and it may be difficult to directly participate in the electrode reaction because it is difficult to receive electrons. Therefore, the amount of sulfur contained is appropriately controlled within the above range.

Among the base solids constituting the positive electrode of the present invention, the electrically conductive material is a material that electrically connects an electrolyte to a positive electrode active material and serves as a path through which electrons move from the current collector to the sulfur, and is not particularly limited as long as it has porosity and conductivity without causing chemical changes in the battery. For example, graphite-based materials such as KS6; carbon blacks such as Super P, carbon black, Denka black, acetylene black, Ketjen black, channel black, furnace black, lamp black, and thermal black; carbon derivatives such as fullerene; electrically conductive fibers such as carbon fiber and metal fiber; carbon fluoride, metal powders such as aluminum and nickel powder; or electrically conductive polymers such as polyaniline, polythiophene, polyacetylene, and polypyrrole can be used alone or in combination.

The electrically conductive material may be preferably used in an amount of 1 to 10 parts by weight, and preferably about 5 parts by weight, based on 100 parts by weight of base solids. If the content of the electrically conductive material contained in the electrode is less than the above range, the unreacted portion of the sulfur in the electrode is increased and eventually the capacity is reduced. If the content exceeds the above range, the high efficiency discharging characteristic and the charging/discharging cycle lifetime are adversely affected. Therefore, it is desirable to determine the appropriate content within the above-mentioned range.

The binder as the base solids is a material that is comprised to cause a slurry composition of the base solids that forms a positive electrode to adhere well to the current collector, and that is well dissolved in a solvent and can well constitute a conductive network between a positive electrode active material and a conductive material. Unless otherwise specified, all binders known in the art can be used, and preferably poly(vinyl)acetate, polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride (PVdF), polyhexafluoropropylene, copolymer(product name: Kynar) of polyvinylidene fluoride, poly(ethyl acrylate), polyvinylchloride, polytetrafluoroethylene, polyacrylonitrile, polyvinylpyridine, polystyrene, carboxy methyl cellulose, siloxane-based binder such as polydimethylsiloxane, rubber-based binder comprising styrene-butadiene rubber, acrylonitrile-butadiene rubber, and styrene-isoprene rubber, ethyleneglycol-based binder such as polyethylene glycol diacrylate and derivatives thereof, blends thereof, and copolymers thereof may be used, but the present invention is not limited thereto.

The binder may be used in an amount of 1 to 10 parts by weight, and preferably about 5 parts by weight, based on 100 parts by weight of the base composition contained in the electrode. If the content of the binder resin is less than the above range, the physical properties of the positive electrode are degraded, and thus the positive electrode active material and the electrically conductive material can be dropped off. If the content of the binder resin exceeds the above range, the ratio of the active material and the electrically conductive material in the positive electrode may be relatively decreased, thereby reducing the battery capacity. Therefore, it is preferable that the content of the binder resin is appropriately determined within the above-mentioned range.

As described above, the positive electrode comprising goethite and base solids can be prepared by conventional methods. For example, to a positive electrode active material, a solvent, and if necessary, a binder, an electrically conductive material, and a dispersant were mixed and stirred to prepare a slurry. Then, the prepared slurry can be applied (coated) on a current collector of a metal material, compressed and then dried to produce a positive electrode.

For example, in preparing the positive electrode slurry, first, after goethite is dispersed in a solvent, the obtained solution is mixed with the active material, the electrically conductive material, and the binder to obtain a slurry composition for forming a positive electrode. Thereafter, this slurry composition is coated on a current collector and dried to complete a positive electrode. At this time, if necessary, the electrode can be manufactured by compression-molding on the current collector to improve the density of the electrode. There are no limitations on the method of coating the slurry. For example, it is possible to use a coating method such as doctor blade coating, dip coating, gravure coating, slit die coating, spin coating, comma coating, bar coating, reverse roll coating, screen coating, cap coating and the like.

At this time, a solvent capable of not only uniformly dispersing a positive electrode active material, a binder, and an electrically conductive material, but also easily resolving goethite can be used as the solvent. As such a solvent, water is most preferable as an aqueous solvent. At this time, water may be a secondary distilled water (DW) or a tertiary distilled water (DIW: deionized water), but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

In one embodiment, the positive electrode comprises a current collector and an electrode active material layer formed on at least one side of the current collector, the electrode active material layer comprises an active material, an electrically conductive material, a binder, and a goethite having urchin shape according to the present invention, and the porosity of the electrode active material layer may be 60 to 75%, specifically 65 to 75%, and preferably 65 to 70%.

In the present invention, the term "porosity" means the ratio of the volume occupied by the pores to the total volume in a structure, and its unit is %.

In the present invention, the measurement of the porosity is not particularly limited. According to one embodiment of the present invention, the micro and meso pore volume can be measured by, for example, a Brunauer-Emmett-Teller (BET) measurement method or a Hg porosimeter.

If the porosity of the electrode active material layer is less than 60%, the degree of filling of the base solid comprising the active material, the electrically conductive material, and the binder becomes excessively high, so that a sufficient electrolyte solution capable of exhibiting ion conduction and/or electric conduction cannot be maintained between the active materials, and thus the output characteristics and the cycle characteristics of the battery may be deteriorated, and also the overvoltage of the battery is severe and the discharging capacity is greatly reduced, and thus, there is a problem that the effect generated by comprising goethite having urchin shape according to the present invention may not be properly manifested. If the porosity exceeds 75% and thus is too high, there are problems that the physical and electrical connection with the current collector is lowered and the adhesive force is lowered and the reaction becomes difficult and that the energy density of the battery may be lowered because the pores due to the increased porosity are filled with the electrolyte solution. Therefore, the porosity is appropriately controlled within the above range. According to an embodiment of the present invention, the porosity may be performed by a method selected from the group consisting of a hot press method, a roll press method, a plate press method, and a roll laminate method.

Lithium Secondary Battery

Meanwhile, the present invention provides a lithium secondary battery comprising a positive electrode, a negative electrode, a separator interposed therebetween, and an electrolyte, wherein the positive electrode is the positive electrode as described above.

At this time, the negative electrode, separator, and electrolyte may be composed of conventional materials that can be used in a lithium secondary battery.

Specifically, the negative electrode may comprise a material capable of reversibly intercalating or deintercalating lithium ion (Li$^+$), a material capable of reacting with lithium ion to reversibly form a lithium-containing compound, lithium metal, or a lithium alloy as an active material.

The material capable of reversibly intercalating or deintercalating lithium ion (Li$^+$) may be, for example, crystalline carbon, amorphous carbon, or mixtures thereof. In addition, the material capable of reacting with lithium ion (Li$^+$) to reversibly form the lithium-containing compound may be, for example, tin oxide, titanium nitrate, or silicon. In addition, the lithium alloy may be, for example, an alloy of lithium and the metal selected from the group consisting of Na, K, Rb, Cs, Fr, Be, Mg, Ca, Sr, Ba, Ra, Al, and Sn.

In addition, the negative electrode may further optionally comprise a binder together with a negative electrode active material. The binder acts to cause negative electrode active materials to become a paste and create mutual adhesion between the active materials, adhesion between the active materials and the current collector, and buffer effect for the expansion and contraction of the active materials, etc. Specifically, the binder is the same as that described above.

In addition, the negative electrode may further comprise a current collector for supporting a negative electrode active layer comprising a negative electrode active material and a binder. The current collector may be specifically selected from the group consisting of copper, aluminum, stainless steel, titanium, silver, palladium, nickel, alloys thereof, and combinations thereof. The stainless steel may be surface-treated with carbon, nickel, titanium, or silver, and an aluminum-cadmium alloy may be used as the alloy. In addition, sintered carbon, a nonconductive polymer surface-treated with an electrically conductive material, or a conductive polymer may be used.

In addition, the negative electrode may be a thin film of lithium metal.

As the separator, a material capable of separating or insulating the positive electrode and the negative electrode from each other while allowing the lithium ion to be transported therebetween is used. The material can be used as a separator without any particular limitations as long as it is used as a separator in the lithium secondary battery. Particularly, it is desirable to use a separator having excellent wettability to the electrolyte while having low resistance to ion migration of the electrolyte.

More preferably, as the material for the separator, a porous, nonconductive, or insulating material can be used, and for example, the separator may be an independent member such as a film, or may comprise a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point can be used, but are not limited thereto.

The electrolyte is a non-aqueous electrolyte containing lithium salt and is composed of lithium salt and an electrolyte solution, and as the electrolyte solution, non-aqueous organic solvent, organic solid electrolyte, and inorganic solid electrolyte are used.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, lithium chloroborane, lithium lower aliphatic carboxylate, and lithium imide.

The concentration of the lithium salt may be 0.2 to 2 M, preferably 0.6 to 2 M, and more preferably 0.7 to 1.7 M depending on various factors such as the exact composition of the electrolyte mixture, the solubility of the salt, the conductivity of the dissolved salt, the charging and discharging conditions of the battery, the operating temperature, and other factors known in the lithium battery field. If the concentration of the lithium salt is less than the above range, the conductivity of the electrolyte may be lowered and thus the performance of the electrolyte may be deteriorated. If the concentration of the lithium salt exceeds the above range, the viscosity of the electrolyte may increase and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate(EP), toluene, xylene, dimethyl ether (DME), diethylether, triethylene glycol monomethyl ether (TEGME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol diacetate, dimethyl sulfite, or ethyleneglycol sulfite can be used alone or in a mixed solvent form of two or more solvents thereof.

As the organic solid electrolyte, preferably, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte of the present invention, preferably, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, and Li$_3$PO4-Li$_2$S—SiS$_2$ may be used.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed in a battery case. Thereafter, a lithium secondary battery is manufactured by injecting an electrolyte solution into the upper part of the case and sealing it with a cap plate and a gasket.

The lithium secondary battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery according to the present invention constituted as described above comprises goethite to absorb the lithium polysulfide generated during charging/discharging of the lithium secondary battery, thereby increasing the reactivity of the positive electrode of the lithium secondary battery, and having the effect of increasing discharging capacity and lifetime characteristics of the lithium secondary battery.

Hereinafter, the present invention will be described in more detail with reference to examples and the like. However, the scope and content of the present invention cannot be construed as narrowing down or limiting the invention by examples and the like. Also, it will be apparent on the basis of the disclosures of the present invention comprising the following examples that the present invention, in which experimental results are not specifically shown, can be easily carried out by those skilled in the art and that such modifications and variations are intended to fall within the scope of the appended claims.

PREPARATION EXAMPLE 1

Preparation of Goethite having Urchin Shape 1.2 g of $Na_2SO_4$ and 2.0 g of $Na_2S_2O_3$ (Aldrich company, respectively) were added to 100 ml of deionized water (DIW) to prepare a solution (1), and 2.02 g of $FeCl_3.6H_2O$ (Aldrich company) was added to 100 ml of ethanol to prepare a solution (2).

The prepared solution (2) was added to the prepared solution (1). At this time, it was confirmed that the mixed solution was changed to black instantaneously, and then that after several tens of seconds, the mixed solution was changed to a yellowish orange color.

The mixed solution was stirred at a heating rate of 2.5° C./min and reacted at 70° C. for 6 hours. After completion of the reaction, the resultant was washed with DIW and ethanol.

Thereafter, sufficient air was introduced into a convection oven at 80° C., followed by drying for 8 hours to obtain a goethite having urchin shape.

PREPARATION EXAMPLE 2

Preparation of Goethite having Rod Shape 0.05 M of $Fe(NO_3)_3.9H_2O$ (Aldrich company, purity of 98% or more) was mixed with 0.3 M $N_2H_4.H_2O$ (Aldrich company, purity of 98% or more) for 50 seconds. Thereafter, the mixed solution was stirred at 80° C. at 400 rpm for 2 hours. Thereafter, the resultant was filtered through filter paper, and then allowed sufficient air to be introduced and dried at 80° C. for 8 hours to obtain goethite ($\alpha$-FeOOH) having rod shape.

PREPARATION EXAMPLE 3

Preparation of Lepidocrocite 0.3 M $NaBH_4$ (TCL company, purity>95%) was mixed with 0.05 M $Fe(NO_3)_3.9H_2O$ (product from Aldrich company, purity of 98% or more) for 50 seconds. Thereafter, the mixed solution was stirred for 40 minutes at 400 rpm at room temperature of 25° C., and it was confirmed that hydrogen gas was generated during the reaction. Thereafter, the resultant was filtered through filter paper, and then allowed sufficient air to be introduced and dried at 80° C. for 8 hours to obtain lepidocrocite ($\gamma$-FeOOH).

EXAMPLE 1

Manufacturing of Lithium Secondary Battery Comprising Positive Electrode with Containing Goethite having Urchin Shape First, 10 parts by weight of goethite relative to the total weight (100 parts by weight) of the base solids (an active material, an electrically conductive material, and a binder) into which the goethite prepared in Preparation Example 1 will be added was dissolved in water as a solvent. Subsequently, with respect to the obtained solution, a total of 100 parts by weight of base solids, that is, 88 parts by weight of sulfur-carbon composite (S/C of 7:3) as an active material, 5 parts by weight of Denka black as an electrically conductive material, and 7 parts by weight of styrene butadiene rubber/carboxymethyl cellulose (SBR/CMC of 7:3) as a binder were added and mixed to prepare a slurry composition for a positive electrode.

Subsequently, the prepared slurry composition was coated on a current collector (Al Foil) and dried at 50° C. for 12 hours to prepare a positive electrode. At this time, the loading amount was 3.5 $mAh/cm^2$, the porosity of the electrode (the active material layer except for the current collector) was 70%. The porosity of the electrode was calculated by calculating the true density depending on a weighted average from the mixing ratio of the sulfur-carbon composite, the electrically conductive material, the binder, and the goethite contained in the positive electrode active material layer, and measuring the thickness and weight of the positive electrode after the roll press rolling process.

Then, a coin cell of a lithium secondary battery comprising the positive electrode prepared as described above, a negative electrode, a separator, and an electrolyte solution was prepared as follows. Specifically, the positive electrode was punched out into a circular electrode of 14 phi, polyethylene (PE) separator was punched out to have 19 phi, and 150 um lithium metal was punched out to have 16 phi as negative electrode.

COMPARATIVE EXAMPLE 1

Manufacturing of Lithium Secondary Battery Comprising Positive Electrode without Containing Goethite A lithium secondary battery was manufactured in the same manner as in Example 1, except that goethite was not added to the positive electrode.

COMPARATIVE EXAMPLE 2

Manufacturing of Lithium Secondary Battery Comprising Positive Electrode with Containing Goethite having Rod Shape A lithium secondary battery was manufactured in the same manner as in Example 1, except that the goethite having rod shape prepared in Preparation Example 2 instead of the goethite having urchin shape prepared in Preparation Example 1 was added in an amount of 10 parts by weight relative to 100 parts by weight of the base solids.

COMPARATIVE EXAMPLE 3

Manufacturing of Lithium Secondary Battery Comprising Positive Electrode with Containing Lepidocrocite A lithium secondary battery was manufactured in the same manner as in Example 1, except that the lepidocrocite prepared in Preparation Example 3 instead of the goethite having urchin shape prepared in Preparation Example 1 was added in an amount of 10 parts by weight relative to 100 parts by weight of the base solids.

EXPERIMENTAL EXAMPLE 1

Scanning Electron Microscope (SEM) Analysis

SEM analysis (S-4800 FE-SEM from Hitachi company) was performed on the goethite prepared in Preparation Examples 1 and 2 and the lepidocrocite prepared in Preparation Example 3.

FIGS. 1 and 2 are SEM images of the goethite prepared in Preparation Example 1, respectively, and FIG. 3 is an SEM image of the goethite prepared in Preparation Example 2, and FIG. 4 is an SEM image of the lepidocrocite prepared in Preparation Example 3.

Referring to FIGS. 1 and 2, it was confirmed from the results of SEM analysis with the magnification of 20 k and 35 k, respectively that the goethite having 'urchin shape' with an average particle diameter of 500 nm to 5 µm formed by aggregation of primary particles of goethite having rod shape was produced.

Referring to FIG. 3, it was confirmed from the result of SEM analysis with a magnification of 50 k that the goethite having 'rod shape' was produced.

Referring to FIG. 4, it was confirmed from the result of SEM analysis with a magnification of 50 k that the lepidocrocite having 'plate shape' was produced.

EXPERIMENTAL EXAMPLE 2

X-Ray Diffraction (XRD) Analysis

XRD analyzes (D4 Endeavor from Bruker company) were performed on the goethite prepared in Preparation Examples 1 and 2 and the lepidocrocite prepared in Preparation Example 3.

FIG. 5 is a graph showing the result of XRD analysis for the goethite prepared in Preparation Example 1, FIG. 6 is a graph showing the result of XRD analysis for the goethite prepared in Preparation Example 2, and FIG. 7 is a graph showing the result of XRD analysis for the lepidocrocite prepared in Preparation Example 3, respectively.

As a result of the X-ray diffraction of FIGS. 5 and 6, effective peaks were detected at 2θ=21.223°, 33.241°, 34.700°, 36.055°, 36.649°, 39.984°, 41.186°, 53.237°, and 59.023°, and as a result of the X-ray diffraction of FIG. 7, effective peaks were detected at 2θ=14.1±0.1°, 27.0±0.1°, 36.3±0.1° and 46.9±0.1°, thereby confirming the XRD peaks of the goethite and the lepidocrocite, respectively, and from this, it was found that the crystalline goethite and lepidocrocite of the pure phase were prepared in Preparation Examples 1 to 3.

EXPERIMENTAL EXAMPLE 3

Comparative Experiment of Discharging Capacity of Lithium Secondary Battery

In order to test the initial discharging capacity of the lithium secondary battery according to the type of positive electrode material, the discharging capacity was measured after configuring the positive electrode and the negative electrode of the lithium secondary battery as shown in Table 1 below.

At this time, the measurement current was 0.1 C, the voltage range was 1.8 to 2.5V, and the results are shown in FIG. 9.

TABLE 1

| | Lithium secondary battery | |
|---|---|---|
| | Negative electrode | Positive electrode |
| Example 1 | metal lithium | sulfur-carbon composite (S/C 70:30) + electrically conductive material + binder + goethite of Preparation Example 1 (88:5:7:5, weight ratio) |
| Comparative Example 1 | metal lithium | sulfur-carbon composite (S/C 70:30) + electrically conductive material + binder (90:5:5, weight ratio) |
| Comparative Example 2 | metal lithium | sulfur-carbon composite (S/C 70:30) + electrically conductive material + binder + goethite of Preparation Example 2 (88:5:7:5, weight ratio) |
| Comparative Example 3 | metal lithium | sulfur-carbon composite (S/C 70:30) + electrically conductive material + binder + lepidocrocite of Preparation Example 3 (88:5:7:5, weight ratio) |

As shown in FIG. 9, in the case of the batteries according to Example 1 comprising goethite having urchin shape and Comparative Example 2 comprising lepidocrocite, it was confirmed that the overvoltage of the battery is improved and the initial discharging capacity is further increased, as compared with the battery according to Comparative Example 1.

Therefore, in the case where goethite or lepidocrocite is comprised in the positive electrode for the lithium secondary battery, it was found that both have effects of increasing the initial discharging capacity and improving the overvoltage of the lithium secondary battery.

EXPERIMENTAL EXAMPLE 4

Comparative Experiment of Lifetime Characteristics of Lithium Secondary Battery

In order to test the lifetime characteristics of the lithium secondary battery depending on the type of the positive electrode material, the discharging capacity depending on the cycle was measured after configuring the positive electrode and the negative electrode of the lithium secondary battery as shown in Table 1, and the results are shown in FIG. 10. The measurement was performed by repeating the cycle at 0.3 C/0.5 C after 3 cycles at 0.1 C/0.1 C (charging/discharging) and 3 cycles at 0.2 C/0.2 C.

As shown in FIG. 10, in the case of the lithium secondary batteries of Example 1 and Comparative Example 2 comprising goethite or lepidocrocite in the positive electrode, it was found that in the intervals of 0.1 C, 0.2 C, and 0.5 C, the discharging capacity is higher and also the lifetime characteristics are improved.

Also, for the battery of Example 1, it was confirmed that as a result of adsorbing lithium polysulfide produced during charging/discharging of the battery and increasing the reactivity of the battery by securing enough space to impregnate the electrolyte solution by the pore-generating property of secondary particles having urchin shape formed by the aggregation of goethite having rod shape, the discharging capacity of the lithium secondary battery is excellent, and at the same time, the lifetime characteristics are further improved, as compared to the battery according to Comparative Example 2.

The invention claimed is:

1. A positive electrode for a lithium-sulfur battery comprising:
   an active material comprising a sulfur-carbon composite;
   an electrically conductive material;
   a binder; and
   goethite having urchin shape which is in a form of a secondary particle comprising aggregated primary particles; wherein the primary particles are rod shaped; and
   wherein a content of the goethite is 1 parts by weight to 15 parts by weight relative to 100 parts by weight of base solids of the active material, the electrically conductive material, and the binder.

2. The positive electrode for the lithium-sulfur battery according to claim 1, wherein the primary particles having rod shape have a diameter of 10 nm to 50 nm.

3. The positive electrode for the lithium-sulfur battery according to claim 1, wherein the primary particles having rod shape have a length of 50 nm to 500 nm.

4. The positive electrode for the lithium-sulfur battery according to claim 1, wherein the secondary particle has a radial needle-like protrusion structure.

5. The positive electrode for the lithium-sulfur battery according to claim 1, wherein the goethite has an average particle diameter of 500 nm to 5 μm.

6. The positive electrode for the lithium-sulfur battery according to claim 1, wherein the sulfur-carbon composite has a sulfur content of 60 parts by weight to 80 parts by weight based on 100 parts by weight of sulfur-carbon composite.

7. The positive electrode for the lithium-sulfur battery according to claim 1, further comprising:
   a current collector; and
   an electrode active material layer on at least one surface of the current collector, said electrode active material layer comprising the electrode active material, the electrically conductive material, the binder, and the goethite,
   wherein a porosity of the electrode active material layer is 60% to 75%.

8. A lithium-sulfur battery comprising a positive electrode, a negative electrode, a separator interposed therebetween, and an electrolyte, wherein the positive electrode is the positive electrode for the lithium-sulfur battery of claim 1.

* * * * *